United States Patent [19]
Melchior

[11] Patent Number: 5,649,506
[45] Date of Patent: Jul. 22, 1997

[54] COUPLING FOR THE TRANSMISSION OF ALTERNATING TORQUES

[76] Inventor: Jean Frédéric Melchior, 126 Bld du Montparnasse, 75 014 Paris, France

[21] Appl. No.: 978,890

[22] Filed: Nov. 19, 1992

Related U.S. Application Data

[63] Continuation of Ser. No. 576,451, Sep. 13, 1990.

[30] Foreign Application Priority Data

Jan. 13, 1989 [FR] France .................................. 89 00366
Jan. 5, 1990 [WO] WIPO ....................... PCT/FR90/00009

[51] Int. Cl.$^6$ ...................................................... F01L 1/34
[52] U.S. Cl. ........................... 123/90.17; 123/90.31
[58] Field of Search ............................ 123/90.15, 90.17, 123/90.31

[56] References Cited

U.S. PATENT DOCUMENTS

| | | | |
|---|---|---|---|
| 2,159,017 | 5/1939 | Duncan | 123/90.15 |
| 2,191,459 | 2/1940 | Duncan | 123/90.17 |
| 2,305,787 | 12/1942 | Kales | 123/90.15 |
| 2,326,329 | 8/1943 | Camp | 123/90.15 |
| 2,488,361 | 11/1949 | Witzky et al. | 74/395 |
| 2,773,490 | 12/1956 | Miller | 123/432 |
| 2,804,061 | 8/1957 | Gamble | 123/90.18 |

(List continued on next page.)

FOREIGN PATENT DOCUMENTS

| | | |
|---|---|---|
| 0 163 046 | 12/1985 | European Pat. Off. . |
| 0266511 | 5/1988 | European Pat. Off. . |
| 1085087 | 1/1955 | France . |
| 2187051 | 1/1974 | France . |
| 1081718 | 5/1960 | Germany . |
| 2032581 | 2/1971 | Germany . |
| 1947362 | 4/1971 | Germany . |
| 2525746 | 6/1975 | Germany . |
| 3247916 | 6/1984 | Germany . |
| 3701867 | 8/1988 | Germany . |
| 375951 | 10/1939 | Italy . |
| 61-268810 | 5/1985 | Japan . |
| 62-292615 | 11/1987 | Japan . |
| 1303528 | 1/1973 | United Kingdom . |
| 1413099 | 11/1975 | United Kingdom . |
| 2217812 | 11/1991 | United Kingdom . |
| 89/10469 | 11/1989 | WIPO . |
| 90/08248 | 7/1990 | WIPO . |

OTHER PUBLICATIONS

Evans–"Automotive Engine Alternatives"; 1987.
Ma–"Computer Simulation of an Otto–Atkinson Cycle Engine with Variable Timing Multi–Intake Valves and Variable Compressio Ratio"; 1988.
Ma–"Effect of Variable Engine Valve Timing on Fuel Economy"; (SAE 1988).
Scott–"Eccentric Cam Drive Varies Valve Timing", Automotive Engineering (Oct. 1980).
Ingold–"System for Automatic Variation of Phase Between Two Camshafts, Inserted into a 'Cassette' Module, with Sachs–Huret Chain".
Stone–"Variable Valve Timing for IC Engines" Automotive Engineer.
Scott–"Variable Valve Timing Has Electronic Control" May, 1984.

*Primary Examiner*—Noah P. Kamen
*Attorney, Agent, or Firm*—Barnes, Kisselle, Raisch, Choate, Whittemore & Hulbert, P.C.

[57] ABSTRACT

One of the driving and driven parts of the coupling is connected to a cylinder (10) and the other to a piston (11) which delimit therebetween two antagonistic chambers (13, 14). The chambers have a substantially constant volume, are filled with a practically incompressible hydraulic liquid, and are interconnected through two unidirectional circuits (18, 19) which have opposite directions and each a substantially constant volume. A distributing device (22) is so arranged as to either bring into action one or the other of the unidirectional circuits, or to neutralize both of them.

19 Claims, 4 Drawing Sheets

U.S. PATENT DOCUMENTS

| | | | |
|---|---|---|---|
| 2,861,557 | 11/1958 | Stolte | 123/90.15 |
| 2,936,575 | 5/1960 | Lieberherr | 123/90.16 |
| 2,958,315 | 11/1960 | Williams | 123/65 UC |
| 3,004,410 | 10/1961 | Pierce | 123/90.15 |
| 3,109,417 | 11/1963 | Bekkala et al. | 123/90.15 |
| 3,331,256 | 7/1967 | Morris | 74/397 |
| 3,369,532 | 2/1968 | McIlroy | 123/90.16 |
| 3,685,499 | 8/1972 | Meacham | 123/90.15 |
| 3,721,220 | 3/1973 | Garcea | 123/90.15 |
| 3,827,413 | 8/1974 | Meacham | 123/408 |
| 3,978,829 | 9/1976 | Takahashi | 123/90.15 |
| 4,131,096 | 12/1978 | Mitchell | 123/90.15 |
| 4,231,330 | 11/1980 | Garcea | 123/90.15 |
| 4,305,352 | 12/1981 | Oshima | 123/90.15 |
| 4,421,074 | 12/1983 | Garcea et al. | 123/90.15 |
| 4,481,912 | 11/1984 | Stwiorok et al. | 123/90.15 |
| 4,494,495 | 1/1985 | Nakamura et al. | 123/90.15 |
| 4,494,496 | 1/1985 | Nakamura et al. | 123/90.15 |
| 4,498,431 | 2/1985 | Nakamura et al. | 123/90.15 |
| 4,535,731 | 8/1985 | Banfi | 123/90.15 |
| 4,561,390 | 12/1985 | Nakamura et al. | 123/90.15 |
| 4,601,266 | 7/1986 | Oldfield et al. | 123/90.15 |
| 4,627,825 | 12/1986 | Bruss et al. | 464/2 |
| 4,685,429 | 8/1987 | Oyaizu | 123/90.15 |
| 4,708,101 | 11/1987 | Hara et al. | 123/90.16 |
| 4,714,057 | 12/1987 | Wichart | 123/90.15 |
| 4,723,517 | 2/1988 | Frost | 123/90.31 |
| 4,726,331 | 2/1988 | Oyaizu | 123/90.15 |
| 4,744,338 | 5/1988 | Sapienza, IV | 123/90.15 |
| 4,747,375 | 5/1988 | Williams | 123/90.15 |
| 4,762,097 | 8/1988 | Baker | 123/90.31 |
| 4,771,742 | 9/1988 | Nelson et al. | 123/90.17 |
| 4,785,635 | 11/1988 | Melchior et al. | 60/606 |
| 4,787,345 | 11/1988 | Thoma | 123/90.17 |
| 4,794,848 | 1/1989 | Melchior | 92/159 |
| 4,802,376 | 2/1989 | Stidworthy | 74/394 |
| 4,805,566 | 2/1989 | Ampferer | 123/90.15 |
| 4,805,571 | 2/1989 | Humphrey | 123/316 |
| 4,811,698 | 3/1989 | Akasaka et al. | 123/90.17 |
| 4,856,465 | 8/1989 | Denz et al. | 123/90.17 |
| 4,858,572 | 8/1989 | Shirai et al. | 123/90.12 |
| 4,895,113 | 1/1990 | Speier et al. | 123/90.17 |
| 4,903,650 | 2/1990 | Ohlendorf et al. | 123/90.17 |
| 4,938,121 | 7/1990 | Melchior | 92/110 |
| 5,002,023 | 3/1991 | Butterfield et al. | 123/90.15 |
| 5,014,663 | 5/1991 | Melchior | 123/257 |
| 5,018,354 | 5/1991 | Melchior et al. | 60/606 |
| 5,046,460 | 9/1991 | Butterfield et al. | 123/90.15 |
| 5,056,478 | 10/1991 | Ma | 123/90.17 |

COUPLING FOR THE TRANSMISSION OF ALTERNATING TORQUES

This is a continuation of application Ser. No. 07/576,451, filed Sep. 13, 1990.

FIELD OF THE INVENTION

The invention relates to a coupling having a variable phase in operation. This coupling is for the transmission of an alternating torque between a driving part intended to be connected to a driving shaft, and a driven part intended to be connected to a shaft which is normally driven. These parts are subjected in operation to alternating resistant and driving torques. One of the driving and driven parts of the coupling is connected to a cylinder and the other to a piston (or similar such slidable member, generally referred to as "piston" hereinafter) which delimit therebetween at least two antagonistic chambers. Thus, there corresponds to an angular phase difference value between the two shafts a relative and single position between the piston and cylinder. The two chambers have a substantially constant total volume and are filled with a hydraulic liquid which is practically incompressible at the normal operating pressures.

The invention concerns more particularly, but not exclusively, couplings intended to be disposed between the main shaft of an internal combustion engine having valves and/or injectors actuated by at least one camshaft and this camshaft. These couplings are for the purpose of varying in operation the angular setting of the camshaft with respect to the main shaft of the engine. Indeed, in one of these cases, the camshaft is subjected cyclically below the coupling to resistant torques when the rising profiles of the cams open the valves against the action of the usual elastic return means for the latter, and then to driving torques when these return means close the valves by causing them to follow along the descending profiles of the cams. The same is true in the case where the camshaft actuates injectors.

BACKGROUND OF THE INVENTION

Known couplings, of the type defined above employ an exterior power means such as a source of fluid under pressure (see U.S. Pat. No. 2,958,315 and FR-A-2,187,051 and 1,085,087).

SUMMARY OF THE INVENTION

An object of the invention is to arrange the couplings of the type in question in such manner that it is possible to vary in operation the phase between the driving shaft and the normally driven shaft without use of a power means such as a source of fluid under pressure. The invention also has for an object to render these couplings simpler, more compact, less costly and more reliable. It also has for an object to arrange these couplings in such a manner that they allow a large angular difference between the driving shaft and the driven shaft without resulting in angular vibrations. It finally has for an object to allow a rapid phase shift between the driving shaft and the driven shaft.

To this end, the coupling of the type defined hereinbefore is essentially characterized in that the two chambers are interconnected by two unidirectional communication circuits having opposite directions and each having a substantially constant volume. The coupling comprises distributing means arranged in such manner as to either bring into action either of these communication circuits while neutralizing the other, or to neutralize both of them. The action of the distributing means depends on whether the phase difference between the driving and driven parts of the coupling must be either increased or decreased, or maintained constant.

In this way, it is possible to benefit from the differences in the pressures of the hydraulic liquid, which are alternately positive and negative, between two antagonistic chambers of the piston-cylinder assembly for increasing the volume of one or the other of these chambers and correlatively decreasing the volume of the opposite chamber. This is accomplished with the joint action of the unidirectional communication circuits and distribution means, which thereby vary the phase difference in the desired sense by an exchange of hydraulic liquid between the two chambers.

The invention also relates to internal combustion engines provided with a coupling such as that defined hereinbefore between their main shaft and their camshaft or camshafts.

BRIEF DESCRIPTION OF THE DRAWINGS

The invention will be described in more detail hereinafter with the aid of the accompanying drawings.

DETAILED DESCRIPTION OF THE PREFERRED EMBODIMENTS

The invention relates to a coupling which has a variable phase in operation. The coupling comprises a driving part intended to be connected directly or indirectly to a driving shaft, and a driven part intended to be connected directly or indirectly to a shaft which is normally driven. These shafts are, in operation, subjected to alternating resistant and driving torques.

Figure 1:
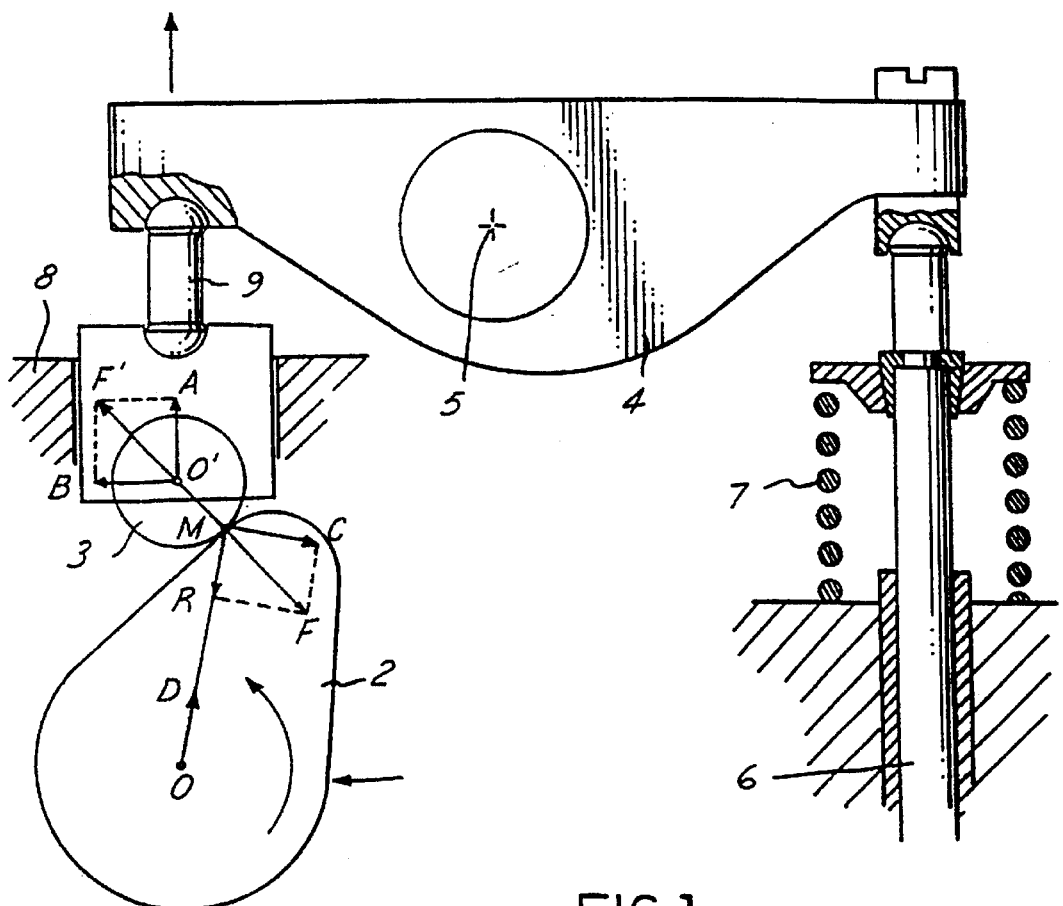
FIGS. 1 and 2 illustrate the distribution of forces and torques in camshaft mechanisms.
Figure 2:
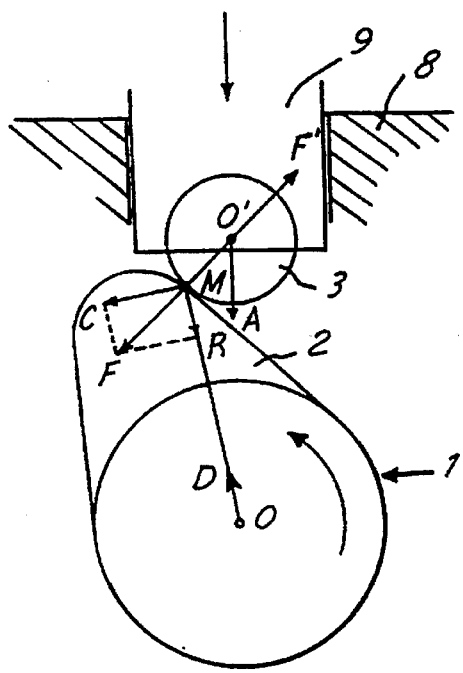

Before describing the invention, it would be of utility to recall how the forces and torques in a camshaft 1 such as that illustrated in FIGS. 1 and 2 are distributed.

The nose of the or each cam 2 of this shaft 1 drives a roller 3 at a point M. Through the medium of a rocker 4 which rocks about a shaft 5, the roller 3 tends to push the rod 6 of a valve against the action of a return spring 7.

In FIG. 1, the roller 3 in rising opposes the movement of the cam 2 by a force $\overline{MF}$ which is normal to the two surfaces in contact. This force is resolved into:

$\overline{MR}$: transverse force applied to the camshaft 1 having an axis of rotation O; and $\overline{MC}$: resistant torque applied to the cam 2.

The force $\overline{MR}$ is balanced by the reaction $\overline{OD}$ of the bearings of the shaft 1.

The force $\overline{MF}$ is balanced by the reaction $\overline{OF}$ of the roller 3. This reaction is resolved into $\overline{OB}$, the lateral reaction of the roller 3 on the frame (or the cylinder head) 8 in which it slides, and a vertical force $\overline{OA}$ which raises the rod 9 of the rocker 4 and compresses the spring 7.

When, owing to the rotation of the shaft 1, the nose of the cam 2 escapes from the roller 3 (FIG. 2), the spring 7 is extended and the axial force $\overline{OA}$ is reversed. This axial force applies to the cam 2 the force $\overline{MF}$ which is resolved into:

$$\overline{MF} = \overline{MR} + \overline{MC}.$$

As the force $\overline{MC}$ is reversed relative to the direction of rotation of the shaft 1, the torque applied to the cam 2 which was resistant in the case of FIG. 1 is reversed and becomes a driving force in the case of FIG. 2. Consequently, the torque applied to the camshaft 1 is alternating.

Figure 3:
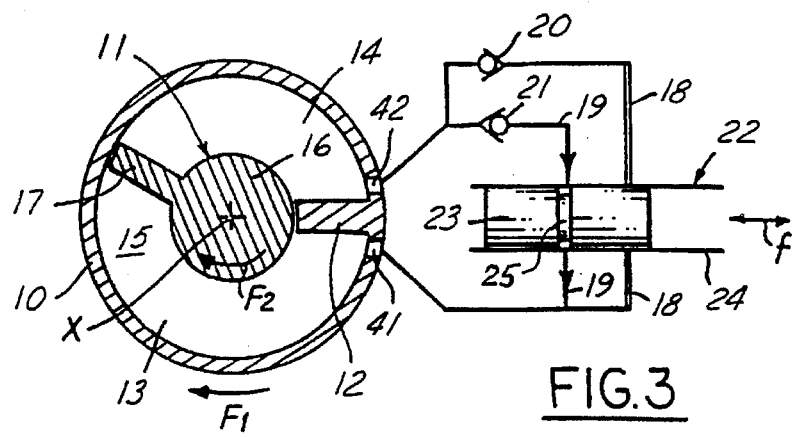
FIG. 3 illustrates a coupling arranged in accordance with a first embodiment of the invention, having a cylinder and a piston undergoing relative movements of rotation.

In the embodiment of the coupling diagrammatically represented in FIG. 3, one of the driving and driven parts of the coupling is connected to, or constituted by, a cylinder 10. The other of these parts is connected to, or constituted by, a piston 11 (or rotor piston as its movement is one of oscillation) which delimits or defines in the cylinder 10, together with a radial partition 12 fixed relative to the cylinder 10, two antagonistic chambers 13 and 14. In the embodiment of FIG. 3 in which the cylinder 10 and the piston 11 undergo relative movements of rotation, the cylinder 10 is constituted by a cylindrical case axially delimited by two transverse walls such as 15 (See also FIG. 13) and the piston 11 is constituted by a shaft 16 which extends through said transverse walls 15 in a sealed manner and carries a radial vane 17 which delimits the two chambers 13 and 14 while isolating them from each other. Apart from the elements 12 and 17, the cylinder 10 and the piston 11 both have a shape of revolution about an axis X about which they are so arranged as to be respectively rotatable in the direction of the arrows $F_1$ and $F_2$. The two chambers 13 and 14 have a substantially constant total volume, are filled with a liquid which is practically incompressible at the normal pressures of operation, and are interconnected by two unidirectional communication circuits 18 and 19 of opposite directions owing to the presence of check valves 20 and 21. Each of the circuits 18 and 19 has a substantially constant volume. The respective orifices through which the chambers 13 and 14 are connected to the circuits 18 and 19 are designated by 41 and 42. The coupling finally comprises distributing means 22 arranged in such manner as to bring into action or neutralize either of the circuits 18 and 19 and to avoid creating substantial pressure drops in the communication, when it exists, between the two chambers 13 and 14.

Figure 10:
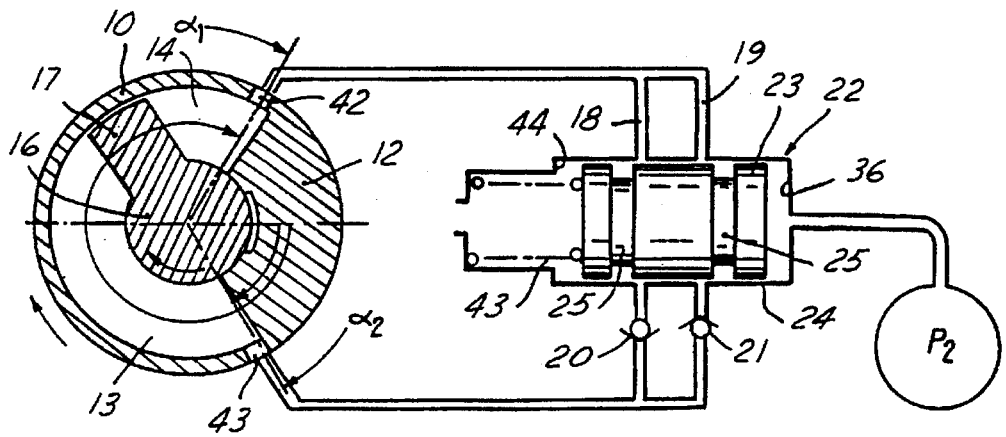
FIG. 10 illustrates the application of the coupling of FIG. 3 to the driving of the camshaft of an engine which is supercharged by a turbocompressor unit, FIG. 11 showing a diagram of operation thereof.

In the embodiment illustrated by way of example in FIG. 3, the distributing means 22 are constituted by a distributor having a slide 23 movable inside a body 24 as diagrammatically represented by the double sided arrow f. This slide 23 includes a groove or open passage 25 (or even two grooves as shown in FIG. 10) capable of ensuring, alternately, the continuity of the circuits 18 and 19, and full bearing surfaces for interrupting these same circuits. Lastly, sealing elements (not shown) are advantageously disposed on one hand on the partition 12 to cooperate with the cylindrical surface of the shaft 16, and on the other hand on the vane 17 to cooperate with the inner cylindrical surface of the cylinder 10.

The coupling represented diagrammatically in FIG. 3 operates in the following manner.

Figure 4:
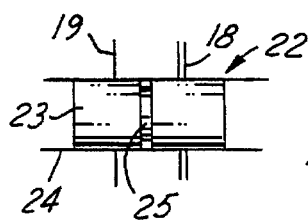
FIGS. 4 and 5 represent the distributor of FIG. 3 in two other positions of operation.
Figure 6:
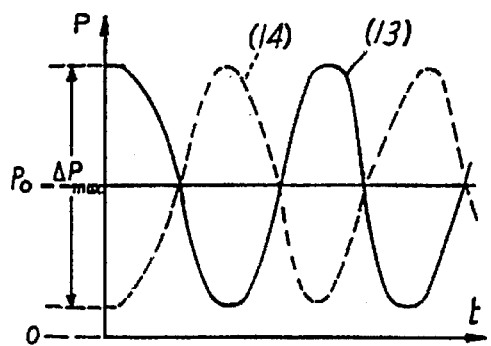
FIG. 6 shows, by means of a curve, how the pressure varies as a function of time in the chambers of the rotary cylinder of FIG. 3.

In the position represented in FIG. 4, the slide 23 presents the full parts in facing relation to the circuits 18 and 19 respectively. The two chambers 13 and 14 are therefore isolated from each other. The torque is transmitted by the hydrostatic compression of the liquid filling the two chambers, the cylinder 10 and the piston 11 rotating together about the axis X. The two shafts respectively connected to the cylinder and the piston 11 rotate in synchronism with a phase difference $\Phi_o$. The pressure in each of the two chambers 13 and 14 varies with the same frequency as that of the torque to which the normally driven shaft is subjected, such as the shaft 1 in FIG. 1. This pressure variation varies in phase opposition in one chamber relative to the other as shown in FIG. 6 where the time t is plotted as abscissae and the pressure P in the chamber 13 (in full line) and the chamber 14 (in dotted line) are plotted as ordinates. This pressure may reach several hundred bars.

Figure 5:
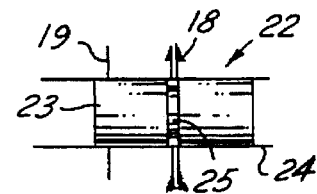

In the position represented in FIG. 5, the slide 23 presents the groove 25 in facing relation to the circuit 18 and a full part in facing relation to the circuit 19. This establishes a communication from the chamber 13 to the chamber 14 through the check valve 20 and prevents any communication from the chamber 14 to the chamber 13. When the pressure in the chamber 13 exceeds the pressure in the chamber 14, liquid flows from the chamber 13 to the chamber 14, which reduces the phase difference between the two shafts. When the pressure in the chamber 14 exceeds that in the chamber 13, no exchange of liquid occurs between the two chambers 13 and 14 and the phase difference remains unchanged. The desired phase difference between the two shafts is therefore established as a function of the duration of opening of the circuit 18, as will be explained in more detail hereinafter.

In the position represented in FIG. 3, the slide 23 presents the groove 25 in facing relation to the circuit 19 and a full part in facing relation to the circuit 18. For reasons opposite to those given with reference to FIG. 5, the phase difference increases each time the pressure in the chamber 14 exceeds the pressure in the chamber 13.

In any case, the phase difference between the driving part and the driven part is at the most equal to the maximum angular movement of the vane 17 in the cylinder 10 between the two faces of the radial partition 12, and it is adjusted by the duration of the opening of the circuit 18 or 19, taking into account the speed of transfer from one of the chambers 13, 14 to the other through the circuit 18 or 19. The dimensioning of these circuits permits adjusting the speed of change from one state to the other, which permits achieving high-speed variations in the phase difference. It can moreover be seen that: after each phase shift, the phase is hydraulically set; and apart from leakages between the chambers 13 and 14, any mechanical oscillation is prevented, notwithstanding variations in the pressure of the hydrostatic liquid in said chambers. It can finally be seen that these effects are obtained without intervention of an exterior power means.

In the foregoing, it has been assumed, in order to simplify the description, that the coupling of FIG. 3 had only two opposed chambers 13 and 14. In reality, it is preferable to arrange that the coupling have at least two pairs of chambers opposed in pairs. Generally, it is sufficient, as shown in FIG.

9, to replace the chamber 13 by two opposed chambers 13a and 13b constantly interconnected through a passage 47, and the chamber 14 by two chambers 14a and 14b constantly interconnected through a passage 48. These chambers 13a, 14a, 13b 14b alternate on the circumference of the cylinder 10. For this purpose it is sufficient to replace the partition 12 by two diametrically opposed partitions 12a and 12b, and the vane 17 by two diametrically opposed vanes 17a and 17b and to provide the passages 47 and 48 in the shaft 16 of the piston 11. This solution has, it is true, the drawback of reducing by one-half the angular movement of the piston 11 relative to the cylinder 10, but has the important advantage of balancing the forces acting on these elements 10 and 11 in operation.

Figure 7:
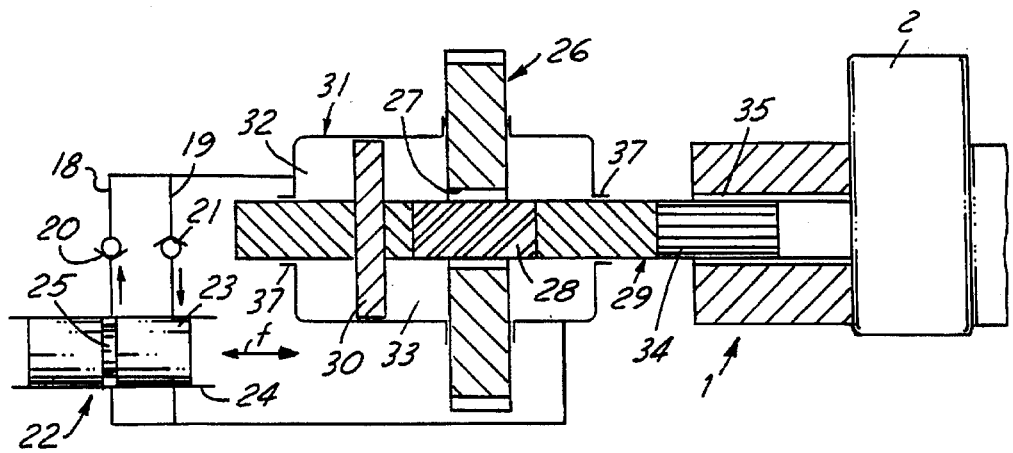
FIG. 7 illustrates a coupling arranged in accordance with a second embodiment of the invention having a cylinder and a piston undergoing relative movements of translation.

In the embodiment of FIG. 7, in which the cylinder and the piston (disk in this embodiment) undergo relative movements of translation, the coupling comprises a gear pinion 26 connected to a driving shaft (not shown). The gear pinion has oblique inner teeth 27 which are meshed with oblique outer teeth 28 carried by the rod 29 of a piston 30. Thus, a displacement in translation of the piston 30 results in a relative rotation of its rod 29 relative to the pinion 26. The piston 30 is movable in translation in a cylinder 31 which is fixed relative to the driving pinion and delimits with the piston two antagonistic chambers 32 and 33 similar to the chambers 13 and 14 of the embodiment of FIG. 3. As in this latter embodiment, the two chambers 32 and 33 are filled with a liquid which is practically incompressible at the normal pressures of operation and are interconnected through two unidirectional communication circuits 18 and 19 having check valves 20 and 21. Furthermore, the coupling comprises distributing means 22 arranged the same as those of FIG. 3. Lastly, the rod 29 comprises straight splines 34 which cooperate with straight grooves 35 provided inside the driven shaft, such as the camshaft 1 of FIG. 1. Still furthermore, sealing elements 37 are provided between the cylinder 31 and the slidable and rotatable rod 29 in addition to the usual sealing elements (not shown) between the cylinder 31 and the piston 30. For balancing purposes and for ensuring the constancy of the sum of the volumes of the two chambers 32 and 33, the rod 29 is mounted through the cylinder 31 on each side of the piston 30 by cylindrical bearing surfaces having equal sections.

The operation of the embodiment of FIG. 7 is similar to that of FIG. 3. Indeed, depending on the position of the slide 23 of the distributing means 22, the piston 30 is either: 1) maintained stationary in translation in the cylinder 31, in which case the phase is maintained constant between the driving shaft coupled to the pinion 26 and the driven shaft 1, or 2) shifted in translation in either direction inside the cylinder 31, in which case an angular phase shift occurs in either direction between the driving shaft and the driven shaft 1 owing to the cooperation of the oblique teeth 27 and 28.

Notwithstanding the interest of the variant of FIG. 7, the embodiment having a rotatable jack or piston of FIG. 3 is preferred for reasons of simplicity and compactness. It is therefore in respect of this embodiment that the variations in the pressure in the antagonistic chambers 13 and 14 will be explained (these variations being moreover similar but reduced by one half in the case where these chambers are doubled and alternated on the circumference of the cylinder 10, as mentioned hereinbefore).

It will first of all be assumed that the fluid filling the chambers 13 and 14 is incompressible, that the sum of the volumes of these two chambers is constant and that there is neither leakage between the two chambers, nor friction.

Figure 8:
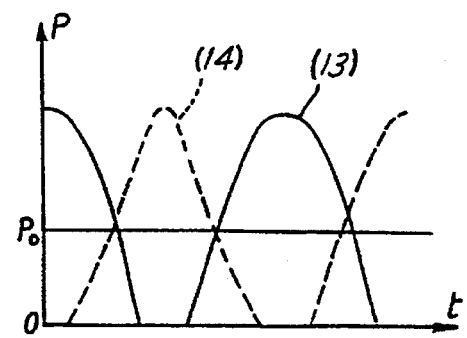
FIG. 8 is a curve permitting a comparison with that of FIG. 6.

If the mean pressure in the chambers 13 and 14 is termed $P_o$ and the maximum variation in the pressure in these chambers is termed $\Delta P_{max}$ two cases can arise:

$P_o > \Delta P_{max}/2$ (FIG. 6): the pressures in the chambers are always positive, or $P_o < \Delta P_{max}/2$ (FIG. 8): the pressure will be periodically cancelled out in the chambers 13 and 14 with creation of cavitation and pockets of vapor.

If, contrary to the aforementioned hypothesis, friction of the shafts and the pinions is taken into account, a continuous component corresponding to the resistant torque of the friction is added to the pressure.

In practice, the maximum variation in the pressure $\Delta P_{max}$ is very high (on the order of 200 to 300 bars). In order to avoid the formation of periodical depressions and cavitation, according to an improvement of the invention illustrated in FIG. 9, the chamber 13 (or 13a, 13b) and the chamber 14 (or 14a, 14b) are put into communication through unidirectional means or check valves 39 and 40 with a pump 38 having a low pressure, for example 5 bars. This pump may therefore be the oil pump of an internal combustion engine equipped with the coupling in question. Note that this pump is a make-up means (or a reserve supply of hydraulic liquid) and not a power means. And this pump is intended to compensate for possible leakages of hydraulic liquid to the exterior, and/or to compensate for small variations in volume resulting from the compression of the hydraulic liquid (which is not quite zero) or to compensate for small variations in volume from the deformation of the chambers and their communication circuits 18 and 19.

As the liquid is slightly compressible and the chambers 13 and 14 slightly deformable, the system behaves as a hydraulic pump. Indeed, assuming that the forced feeding pressure (pump 38) is 5 bars and the maximum variation in the pressure due to the alternating torque is 200 bars, in a first period:

the pressure rises to 100 bars in the chamber 13 and the volume of the latter decreases by the quantity corresponding to the compression of the liquid; and the pressure drops to 5 bars and less in the chamber 14, the check valve 40 opens and the chamber 14 draws in a quantity of liquid equal to the variation in the volume of this chamber.

In the following period, the phenomena are reversed and it is the check valve 39 which allows liquid through to the chamber 13.

Progressively, the two chambers 13 and 14 are filled and the mean pressure $P_o$ will then itself reach a value at least equal to one half of the maximum variation in the pressure to which the forced feed pressure is added. That pressure is, in the cited example, $P_o = 200/2 + 5 = 105$ bars.

In the foregoing, the step-by-step operation of the coupling according to the invention was explained in which, by causing the shifting of the distributing slide 23 in one direction or the other from its neutral or hydrostatic set position (FIG. 4) by pulses of durations $\Delta t$, the phase between the driving shaft and the driven shaft is varied by algebraic increments $\Delta \Phi$ ("open loop" operation or operation with no feedback).

But it would seem still more advantageous to adopt a "closed loop" operation or an operation with feedback. In the preferred embodiment of the coupling according to the invention, some parameters of operation of the engine provided with this coupling depend on the relative position of the main shaft of the engine and of the camshaft controlling the opening and closing of the valves. For example, in an internal combustion engine supercharged by at least one turbocompressor unit such as disclosed in the French patent No. 85 16430 of Nov. 6, 1985 (Publication No. 2,589,518), the angle of opening of the (or each) exhaust valve, at the end of the expansion stroke of the piston, determines the temperature of the gases which enter the supercharging turbine of the engine. Thus, anticipating the opening of the exhaust, for a given load of the engine, increases the temperature and the pressure of the gases entering this turbine and, consequently, the pressure of the supercharging air $P_2$.

According to a development of the invention illustrated in FIG. 10, the position of the distributing slide 23 is controlled by at least one parameter of operation of the engine. In particular, the position is controlled by the pressure of the supercharging air $P_2$, for example by causing this pressure to act on one of the transverse faces of this slide 23 and causing a return spring 43 to act on its other transverse face. It is in this way possible to control the pressure of the supercharging air to prevent it, for example, from dropping below a certain threshold. This threshold may be, for example, the minimum threshold permitting the stable operation of an internal combustion engine having a compression-actuated ignition.

Figure 11:
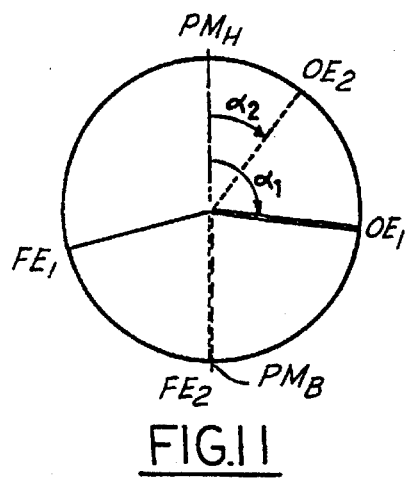

FIG. 11 shows, in an angular diagram where there are indicated in the usual way the top dead center (PMH) and the bottom dead center (PMB) of the piston of a cylinder of an engine equipped with the coupling of FIG. 10, the angle of opening $\alpha_1$ of the exhaust valve of this engine in normal operation and the angle of opening $\alpha_2$ of the same valve when operating at low pressure.

The opening of the exhaust is designated by OE and the closure of the exhaust by FE, and these symbols have the same index as the angles of opening.

In operating at high power, the supercharging pressure, which is high, acts on the distributing slide 23 (FIG. 10) which compresses the spring 43 and comes to bear against a mechanical stop 44. In this position, the slide 23 establishes communication in the direction from the chamber 14 to the chamber 13 through the check valve 21. Thus, owing to the transmission of the alternating torque (FIG. 6), each time the pressure in the chamber 14 exceeds that prevailing in the chamber 13, liquid flows from the chamber 14 to the chamber 13. The phase difference between the driving shaft and the driven shaft increases until the vane 17 comes into abutment against the partition 12. In this position, the angle of opening of the exhaust valve, measured relative to the position of the crankshaft at PMH, is maximum (FIG. 11).

In operating at low power, the supercharging pressure progressively decreases with the power developed by the engine until it reaches the value of said threshold below which the stable operation of the engine is no longer assured. In this situation, the action of the spring 43 on the distributing slide 23 overcomes that of the supercharging pressure, which causes the slide 23 to shift toward the right of FIG. 10 up to a stop 36. Consequently, there is an interruption of the cyclic communication in the direction from the chamber 14 to the chamber 13, and the opening of the cyclic communication in the direction from the chamber 13 to the chamber 14. The chamber 13 will progressively empty into the chamber 14, which will result in the reduction in the phase difference between the crankshaft (driving shaft) and the camshaft (driven shaft). Thus, the opening of the exhaust valve will occur earlier in the expansion stroke of the engine piston. This will increase the energy of the exhaust gases and accelerate the supercharging turbine by producing, by counter-reaction, the increase in the supercharging air pressure. This procedure will continue until the supercharging pressure resumes the threshold value assuring the stable operation of the engine.

In all of the embodiments of the invention represented in FIGS. 3 to 5, 7, 9 and 10 and described hereinbefore, it was assumed that the unidirectional communication circuits 18–21 and the distributing means 22 were located outside the cylinder and the piston of the coupling, in particular outside the rotary cylinder and piston 10 and 11. In fact, it is more advantageous to mount these circuits and means within the cylinder 10.

Figure 9:
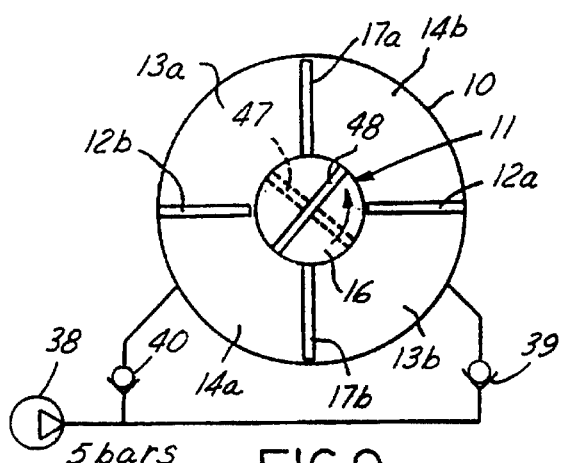
FIG. 9 represents an improvement of the embodiment of FIG. 3.
Figure 12:
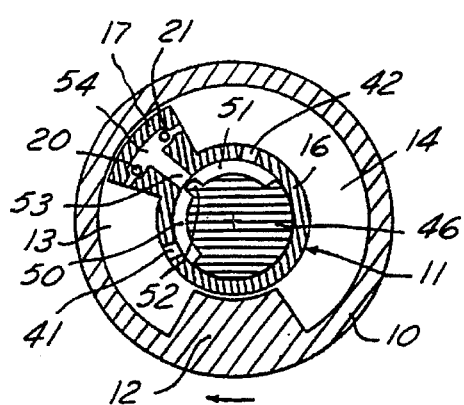
FIGS. 12 and 13 represent respectively by a cross-sectional view and an axial sectional view a coupling whose distributing means and communication circuits are incorporated in rotating parts of the coupling.
Figure 13:
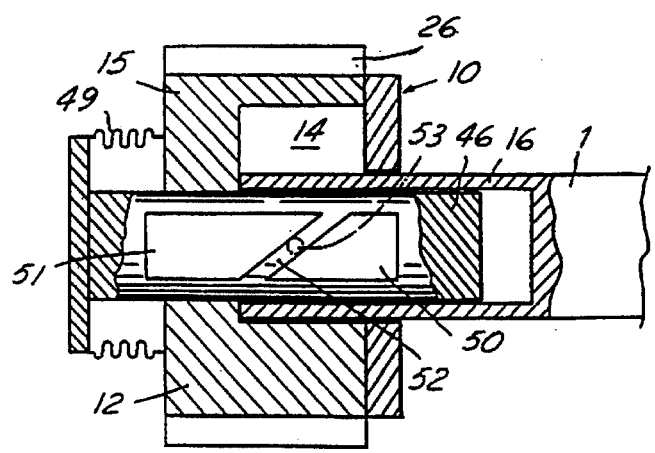

Such a construction is represented in FIGS. 12 and 13, FIG. 12 being a view similar to that of FIGS. 3, 9 and 10. FIG. 13 shows the elements of FIG. 12 in axial section, except for a distributing slide 46 which is in major part represented in elevation. In this case, the rotary cylinder 10 is connected to rotate with the driving shaft by means of a gear pinion 26 and the piston 11 having the vane 17 is connected to the driven shaft 1. The communication circuits 18 and 19 are provided in the rotary piston 11, it being possible to arrange for the check valves 20 and 21 to be carried by the vane 17. The shaft 16 of the piston 11 is hollow and carries internally the rotatable and slidable slide 46, which is substituted for the slidable slide 23 of the preceding embodiments. The slidable slide 46 rotates in synchronism with the driving shaft, i.e. with the rotatable cylinder 10, owing for example to the presence of a bellows 49 which connects the slide 46 to rotate with the cylinder 10 while allowing it to slide axially. The slide 46 includes two external recesses 50 and 51 separated by a rib 52 whose shape will be described hereinafter. The unidirectional communication circuits 18 and 19 comprise (as in the diagrams of FIGS. 3 to 5, 7 and 10) a common section which opens out through an orifice 53 in facing relation to either one of the recesses 50 and 51 or, as shown in dotted line in FIG. 13, in facing relation to the rib 52 which then obturates it. The recess 50 communicates with the chamber 13 through the orifice 41 and the recess 51 communicates with the chamber 14 through the orifice 42, the orifices 41 and 42 extending through the wall of the hollow shaft 16.

When the torque transmitted by the shaft 16 becomes resistant, the partition 12 compresses the liquid in the chamber 13 and decompresses the liquid in the chamber 14. The distributing slide 46 rotates at the same speed as the driving cylinder 10. If, owing to the compressibility of the hydraulic fluid and the leakages between the chambers 13 and 14, the phase difference $\Delta\Phi$ between the driving and driven shafts decreases, the rib 52 of the distributor 46 uncovers the orifice 53 which puts the chamber 54, located between the check valves 20 and 21, in communication with the chamber 13 owing to the orifice 41. An overpressure in the chamber 13 thus closes the check valves 20 and 21. When the torque transmitted by the driven shaft 1 becomes a driving torque owing for example to the action of the elastic return means 7 (FIG. 1), the vane 17 compresses the chamber 14 and decompresses the chamber 13. As the orifice 53 is uncovered owing to the phase shift in the course of the preceding alternation, increasing the pressure in the chamber 14 opens the check valve 21 and this puts the chamber 14 in communication with the chamber 13. This transfer of liquid from the chamber 14 to the chamber 13 increases the phase difference between the driving and driven shafts and consequently corrects the decrease in the phase difference which occurred during the preceding alternation. If this correction is excessive, it will be attenuated during the following alternation, and so on.

With this device, it can be seen that the orifice 53 becomes automatically set in facing relation to the rib 52 irrespective of leakages between the two chambers 13 and 14, provided these remain moderate.

The shape of the rib 52 permits determining the law of variation of the phase as a function of an exterior parameter. For example, in FIG. 13 where it has a helical shape, the phase difference between the two shafts will depend on the position of the distributor 46, which can be varied for example by modifying the pressure inside the bellows 49. Indeed, according to this axial position, the angular position of the orifice 53 will be automatically modified so that it is obturated by the rib 52.

Figure 14:
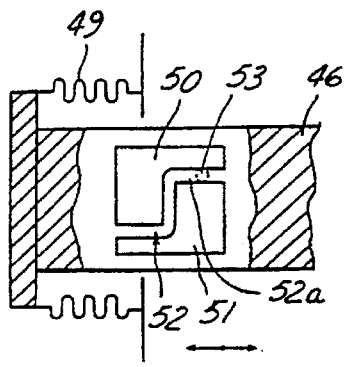
FIGS. 14 to 16 illustrate the application of the coupling of FIGS. 12 and 13 in the control of an internal combustion engine having a supercharging turbocompressor.
Figure 15:
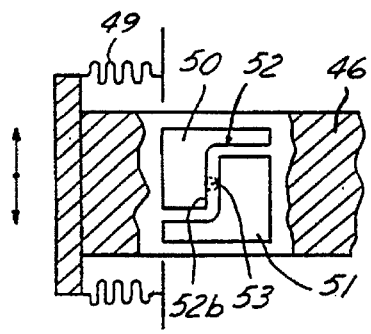
Figure 16:
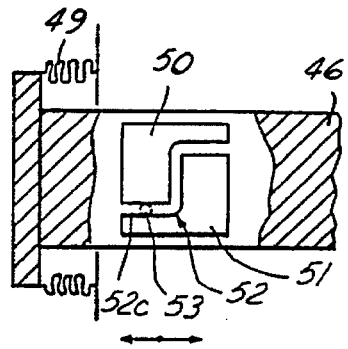

FIGS. 14 to 16 illustrate the application of a coupling similar to that of FIGS. 12 and 13 in the control, the principle of which was explained with reference to FIG. 10, of an internal combustion engine supercharged by at least one turbocompressor. For this purpose, it is sufficient to cause said supercharging pressure $P_2$ to act in the bellows 49. In addition, it is of interest to give the rib 52 not a helical shape as represented in FIG. 13 but a stepped shape, with two end parts 52a and 52c substantially parallel to the axis of translation of the slide 46 and a central part 52b contained in a plane perpendicular to said axis.

The operation is then as follows. In a first stage illustrated in FIG. 14, the orifice 53 is placed in facing relation to the part 52a of the rib 52. The phase difference is set at its maximum value, irrespective of the supercharging pressure, so long as the latter is below a certain threshold (setting in position).

In a second stage illustrated in FIG. 15, the orifice 53 is placed in facing relation to the part 52b of the rib 52. If the supercharging pressure increases, the phase difference decreases and inversely (control by pressure). The phase difference between the driving shaft (crankshaft of the engine) and the driven shaft (camshaft) is automatically adjusted so that the supercharging pressure assumes the value corresponding to the obturation of the orifice 53. As the part 52b is substantially perpendicular to the displacement of the slide 46, the supercharging pressure will be maintained constant.

In a third stage illustrated in FIG. 16, the supercharging pressure exceeds the predetermined threshold owing to the load of the engine. The phase difference reaches the minimum value and remains set at this minimum value irrespective of the value of the supercharging pressure (provided it remains higher than said threshold), owing to the fact that the part 52c of the rib 52 is substantially parallel to the displacement of the slide 46. In this way a physical contact is avoided between the vane 17 and the rib 12 (instead there is a fluid stop), which mechanically preserves the parts and limits the noise.

Figure 17:
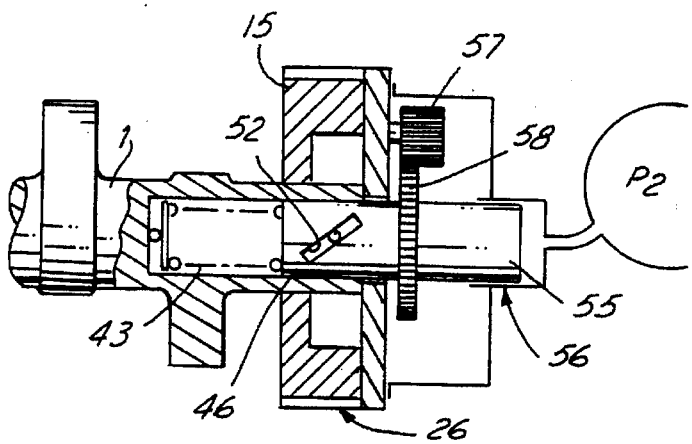
FIGS. 17 and 18 finally illustrate another variant of the foregoing embodiments.
Figure 18:
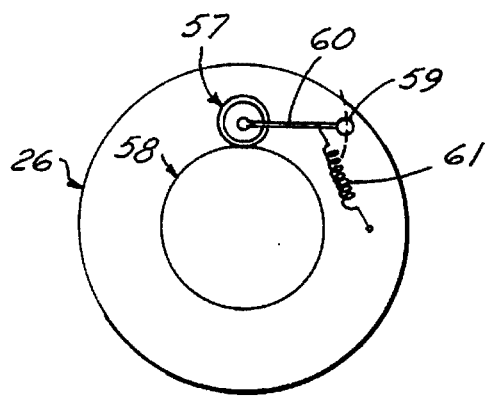

In the foregoing, couplings were described with reference to FIGS. 10, 12 and 13 in which the position of the distributing slide 23 is controlled as a parameter of operation of the engine by the supercharging air pressure $P_2$. As is clear from the foregoing, this position could also be controlled by the speed of the engine and possibly in addition by this supercharging pressure. This will be explained with reference to FIGS. 17 and 18.

The slide 46 has an axial position determined by a piston 55 connected to the slide 46 and slidable in a cylinder 56. The cylinder 56 is connected to the driving gear pinion 26 and cooperates, under the effect of the supercharging pressure $P_2$, with a spring 43. The angular position of the slide 46 is determined by a gear pinion 57 connected to the driving pinion 26 and in mesh with a gear pinion 58 connected to the slide 46. The connecting pinion 57 connected to the driving pinion 26 may vary in its angular position relative to the driving pinion 26 owing to the provision of an eccentric weight 59 cooperating with the shaft of the connecting pinion 57 through a lever arm 60 retained by a spring 61.

Thus a value of the angular position of the slide 36 will correspond to each value of the speed of the driving shaft (and therefore of the engine), while an axial position of the slide 46 will correspond to each value of the supercharging pressure. There is in this way achieved the double control of the phase between the driving pinion and the driven pinion (camshaft) by the speed of rotation of the engine and the supercharging pressure $P_2$.

What is claimed is:

1. In an internal combustion engine having a rotatable crankshaft and a rotatable camshaft, the camshaft being position variable relative to the crankshaft, being subject to torque reversals during the rotation thereof, having a vane with at least one lobe secured to the camshaft for rotation therewith, and having a housing mounted on the camshaft for rotation with the camshaft and for oscillation with respect to the camshaft, the housing having at least one recess defining a fluid receiving chamber and receiving therein the at least one lobe of the vane and permitting oscillation of the at least one lobe within the at least one recess as the housing oscillates with respect to the camshaft, the engine further having means for transmitting rotational movement from the crankshaft to the housing and flow control means for varying the position of the housing relative to the camshaft by controlling fluid flow to and from the housing recess to thereby permit the vane lobe oscillation in the housing recess chamber, the method comprising:

actuating the flow control means to be operable for varying the position of the housing relative to the camshaft in reaction to torque reversals in the camshaft.

2. In an internal combustion engine having a rotatable crankshaft and a rotatable camshaft, the camshaft being position variable relative to the crankshaft and being subject to torque reversals during the operation thereof, the method comprising:

providing the camshaft with a vane having at least one lobe, the vane being rotatable with the camshaft and being non-oscillatable with respect to the camshaft;

providing the camshaft with a housing having at least one recess, the housing being rotatable with the camshaft and being oscillatable with respect to the camshaft, the at least one recess of the housing defining a fluid receiving chamber and receiving therein the at least one lobe of the vane and permitting oscillation of the at least one lobe within the at least one recess as the housing oscillates with respect to the camshaft;

providing means for transmitting rotary movement from the crankshaft to the housing;

providing flow control means for varying the position of the housing relative to the camshaft by controlling fluid flow to and from the housing recess to thereby permit vane oscillation in the housing recess chamber; and actuating the flow control means to be operable for varying the position of the housing relative to the camshaft in reaction to torque reversals in the at least one camshaft.

3. The method according to claim 2 wherein the flow control means (18–25) for varying the position of the housing relative to the camshaft comprises means (18–25) for permitting the position of the housing to move in a first direction relative to the camshaft in reaction to a torque pulse in the camshaft in a first direction, means (18–25) for preventing the position of the housing from moving relative to the camshaft in a second direction in reaction to a torque pulse in the camshaft in a second direction, and means (18–25) for selectively reversing the first and second directions of the movement of the housing relative to the camshaft with respect to the first and second directions of torque pulses in the camshaft.

4. The method according to claim 3 wherein the at least one recess (13–14) is capable of sustaining hydraulic pressure (p.6, lines 19–21; p.7, lines 21–25; p.12, line 21; p.13, lines 18–25; p.22, lines 4–6), wherein the at least one lobe (17, 17a, 17b) divides the at least one recess into a first portion (13) and a second portion (14), and wherein the varying of the position of the housing relative to the camshaft comprises:

transferring hydraulic fluid into one of the first portion and the second portion of the recess (p.8, lines 1–27; p.9, lines 1–27; p.10, lines 1–2).

5. The method according to claim 4 wherein the varying of the position of the housing relative to the camshaft further comprises:

simultaneously transferring hydraulic fluid out of the other of the first portion and the second portion of the recess (p.8, lines 1–27; p.9, lines 1–27; p.10, lines 1–2).

6. The method according to claim 3 wherein the hydraulic fluid is engine lubricating oil from a main oil gallery of the engine (38, p.13, lines 9–29; p.14, lines 1–19).

7. An internal combustion engine comprising:

a crankshaft, said crankshaft being rotatable about an axis;

a camshaft, said camshaft being rotatable about a second axis, said camshaft being subject to torque reversals during the rotation thereof;

a vane having at least one lobe, said vane being attached to said camshaft, being rotatable with said camshaft and being non-oscillatable with respect to said camshaft;

a housing, said housing being rotatable with said camshaft and being oscillatable with respect to said camshaft, said housing having at least one recess, said at least one recess defining a fluid receiving chamber and receiving therein said at least one lobe, said at least one lobe being oscillatable within said at least one recess;

rotary movement transmitting means for transmitting rotary movement from the crankshaft to the housing; and flow control means for varying the position of the housing relative to the camshaft by controlling fluid flow to and from the housing recess to thereby permit the vane lobe oscillation in the housing recess chamber and operable to be reactive to torque reversals in the camshaft for varying the position of the housing relative to the camshaft.

8. An engine according to claim 7 wherein said flow control means reactive to torque reversals comprises control means (18–25) for permitting the housing to move in a first direction relative to the camshaft in reaction to a torque pulse in the camshaft in a first direction and for preventing the housing from moving in a second direction relative to the camshaft in reaction to a torque pulse in the camshaft in a second direction.

9. An engine according to claim 8 wherein said at least one lobe (17, 17a, 17b) divides said at least one recess into a first portion (13) and a second portion (14), and wherein said control means (18–25) comprises means (18–25) for transferring a hydraulic fluid into one of said first portion and said second portion, said one of said first portion and said second portion of said at least one recess being capable of sustaining hydraulic pressure (p.6, lines 11–21; p.7, lines 21–25; p.12, line 21; p.13, lines 18–25; p.22, lines 4–6).

10. An engine according to claim 9 wherein said control means further comprises means (19, 25) for simultaneously transferring hydraulic fluid out of the other of said first portion and said second portion (p.8, lines 1–27; p.9, lines 1–27; p.10; lines 2–22).

11. An engine according to claim 10 wherein each of said first portion and said second portion of said at least one recess is capable of sustaining hydraulic pressure (p.6, lines 10–21; p.7, lines 21–25; p.12, line 21; p.13, lines 18–25; p.22, lines 4–6), and wherein said control means is capable of being reversed (p.3, lines 5–14; p.7, lines 1–12; p.9, lines 7–12) to transfer hydraulic fluid out of said one of said first portion and said second portion and to transfer hydraulic fluid into said other of said first portion and said second portion, said engine further comprising:

an engine control unit ($P_2$, 36, 43, 44; p.15, lines 19–27; p.16, lines 1–27; p.17, lines 1–24) responsive to at least one engine operating condition for selectively reversing the operation of said control means.

12. An internal combustion engine comprising:

a crankshaft, said crankshaft being rotatable about an axis;

a camshaft, said camshaft being rotatable about a second axis, said camshaft being subject to torque reversals during the rotation thereof, a vane having first and second circumferentially spaced apart lobes, said vane being attached to said camshaft, being rotatable with said camshaft and being non-oscillatable with respect to said camshaft;

a housing, said housing being rotatable with said camshaft and being oscillatable with respect to said camshaft, said housing having first and second circumferentially spaced apart recesses, each of said first and second recesses defining a fluid receiving chamber and receiving an associated one of said first and second lobes, and permitting oscillating movement of said associated one of said first and second lobes therein;

rotary movement transmitting means for transmitting rotary movement from the crankshaft to the housing; and flow control means for varying the position of the housing relative to the camshaft by controlling fluid flow to and from the housing recess to thereby permit the vane lobe oscillation in the housing recess chamber and operable to be reactive to torque reversals in the camshaft for varying the position of the housing relative to the camshaft.

13. An engine according to claim 12 wherein said means reactive to torque reversals comprises control means (18–25) for permitting the housing to move in a first direction relative to the camshaft in reaction to a torque pulse in the camshaft in a first direction and for preventing the housing from moving in a second direction relative to the camshaft in reaction to a torque pulse in the camshaft in a second direction.

14. An engine according to claim 13 wherein each of said first (17a) and second (17b) lobes respectively divides each of said first and second recesses (13a, 14b; 14a, 13b) into a first portion (13a, 13b) and a second portion (14a, 14b), and wherein said control means comprises means (18, 25, 47, 48) for transferring hydraulic fluid into one of said first portion and said second portion of each of said first and second recesses, each of said one of said first portion and said second portion of said each of said first and second recesses being capable of sustaining hydraulic pressure (p.6, lines 11–21; p.7, lines 21–25; p.12, line 21; p.13, lines 18–25; p.22, lines 4–6).

15. An engine according to claim 14 wherein said control means comprises means (19, 25, 47, 48) for simultaneously transferring hydraulic fluid out of the other of said first portion and second portion of said each of said first and second recesses.

16. An engine according to claim 15 wherein each of said first portion and said second portion of each of said first and second recesses is capable of sustaining hydraulic pressure (p.6, lines 11–21; p.7, lines 21–25; p.12, line 21; p.13, lines 18–25; p.22, lines 4–6), and wherein said control means is capable of being reversed (p.3, lines 5–14; p.7, lines 1–12; p.9, lines 7–12) to transfer hydraulic fluid out of said one of said first portion and said second portion of said each of said first and second recesses and to transfer hydraulic fluid into said other of said first portion and said second portion of said each of said first and second recesses, said engine further comprising:

an engine control unit ($P_2$, 36, 43, 44; p.15, lines 19–27; p.16, lines 1–27; p.17, lines 1–24) responsive to at least one engine operating condition for selectively reversing the operation of said control means.

17. An engine according to claim 16 and further comprising:

passage means (47, 48) connecting one of said first portion and said second portion of one of said first recess and said second recess with one of said first portion and said second portion of the other of said second recess to permit hydraulic fluid to flow between said one of said first portion and said second portion of said one of said first recess and said second recess and said one of said first portion and said second portion of slid other of said first recess and said second recess.

18. An internal combustion engine comprising:

a first torque transmitting shaft serving as an engine crankshaft, said crankshaft being rotatable about an axis;

a second torque transmitting shaft serving as an engine valve-actuating camshaft, said camshaft being rotatable about a second axis, said camshaft being subject to torque reversals during the rotation thereof;

a vane, said vane having at least one lobe, said vane being attached to one of said shafts, being rotatable with said one shaft and being non-oscillatable with respect to said one shaft;

a housing, said housing being rotatable with said one shaft and being oscillatable with respect to said one shaft, said housing having at least one recess, said at least one recess defining a fluid receiving chamber and receiving therein said at least one lobe, said at least one lobe being oscillatable within said at least one recess;

rotary movement transmitting means for transmitting rotary movement between the other one of said shafts and the housing; and flow control means for varying the position of the housing relative to the camshaft by controlling fluid flow to and from the housing recess to thereby permit the vane lobe oscillation in the housing recess chamber and operable to be reactive to torque reversals in the camshaft for varying the position of the housing relative to the one shaft by permitting the housing to move in a first direction relative to the one shaft in reaction to a torque pulse in the camshaft in a first direction and for preventing the housing from moving in a second direction relative to the one shaft in reaction to a torque pulse in the camshaft in a second direction.

19. A variable phase rotary coupling for transmission of an alternating torque between a driving part which is connected to a driving shaft and a driven part which is connected to a normally driven shaft where the parts in operation are subjected to alternating resistant and driving torques relative to a rotational axis of said coupling comprising:

a plurality of cylinders to which one of the driven and driving parts is connected;

a plurality of pistons to which the other one of the driven and driving parts is connected and which are individually disposed in and relative to said cylinders such that first and second antagonistic chambers are provided in each said cylinder by an associated one of said pistons and such that a relative and single position between each said piston and each said cylinder corresponds to an angular phase difference value between said shafts, said first and second chambers of each said cylinder having a substantially constant total volume and being filled with a hydraulic liquid which is practically incompressible at normal pressures of operation of the coupling;

two phase controlling communication circuits of substantially constant volume which interconnect said antagonistic chambers of each said cylinder and which allow fluid communication between said first and second chambers of each said cylinder only in respective opposite directions;

a distributing means for bringing into fluid communication said chambers of each said cylinder through one or the other of said communication circuits while preventing fluid communication through the other of said communication circuits and for blocking fluid communication between said chambers of each said cylinder, selectively, such that the phase difference between the driving and driven parts is selectively increased, decreased or maintained constant;

wherein said pistons and cylinders are disposed in a circumferentially spaced array about said axis of rotation of said coupling and are oriented to provide a statically and dynamically balanced system about said coupling rotational axis; and wherein said antagonistic first and second chambers of said cylinders are oriented to alternate relative to one another in a circular direction concentric with said coupling rotational axis and said pistons each comprise a rotary vane oscillatable in the associated one of said cylinders.

* * * * *

UNITED STATES PATENT AND TRADEMARK OFFICE
CERTIFICATE OF CORRECTION

PATENT NO. : 5,649,506
DATED : July 22, 1997
INVENTOR(S) : Jean F. Melchior

It is certified that error appears in the above-identified patent and that said Letters Patent is hereby corrected as shown below:

Col 13, Line 35, change "slid" to "said".

Signed and Sealed this

Thirtieth Day of December, 1997

Attest:

BRUCE LEHMAN

Attesting Officer    Commissioner of Patents and Trademarks